United States Patent
Aru et al.

(10) Patent No.: US 11,560,820 B2
(45) Date of Patent: Jan. 24, 2023

(54) STATIC MIXER FOR EXHAUST GAS DUCTS OF INTERNAL COMBUSTION ENGINES, METHOD OF MANUFACTURING THEREOF AND EXHAUST UNIT INCORPORATING THE MIXER

(71) Applicant: Officine Metallurgiche G. Cornaglia S.p.A., Beinasco (IT)

(72) Inventors: Alessandro Aru, Beinasco (IT); Marco Barone, Beinasco (IT); Pier Mario Cornaglia, Beinasco (IT); Cristina Robino, Beinasco (IT); Zakaria Tiji, Beinasco (IT)

(73) Assignee: OFFICINE METALLURGICHE G. CORNAGLIA S.P.A., Beinasco (IT)

( * ) Notice: Subject to any disclaimer, the term of this patent is extended or adjusted under 35 U.S.C. 154(b) by 3 days.

(21) Appl. No.: 17/262,247

(22) PCT Filed: Jul. 23, 2019

(86) PCT No.: PCT/IB2019/056269
§ 371 (c)(1),
(2) Date: Jan. 22, 2021

(87) PCT Pub. No.: WO2020/021444
PCT Pub. Date: Jan. 30, 2020

(65) Prior Publication Data
US 2021/0348538 A1   Nov. 11, 2021

(30) Foreign Application Priority Data

Jul. 23, 2018  (IT) ........................ 102018000007427

(51) Int. Cl.
*F01N 3/28*     (2006.01)
*F01N 3/20*     (2006.01)

(52) U.S. Cl.
CPC .......... *F01N 3/2892* (2013.01); *F01N 3/2066* (2013.01); *F01N 2240/20* (2013.01); *F01N 2470/04* (2013.01); *F01N 2610/02* (2013.01)

(58) Field of Classification Search
CPC .. F01N 3/2892; F01N 3/2066; F01N 2240/20; F01N 2610/02; F01N 2470/04;
(Continued)

(56) References Cited

U.S. PATENT DOCUMENTS

| 7,533,520 B2 | 5/2009 | Cheng et al. |
| 8,956,040 B2 * | 2/2015 | Cornaglia ............. F01N 3/2892 |
| | | 366/337 |

(Continued)

FOREIGN PATENT DOCUMENTS

| DE | 102017128672 A1 * | 2/2018 |
| DE | 102017128672 A1 | 2/2018 |

(Continued)

OTHER PUBLICATIONS

International Search Report and Written Opinion of the International Searching Authority dated Nov. 21, 2019 for International Patent Application No. PCT/IB2019/056269.

*Primary Examiner* — Devon C Kramer
*Assistant Examiner* — Kelsey L Stanek
(74) *Attorney, Agent, or Firm* — Howson & Howson LLP (57) ABSTRACT

A static mixer for exhaust gas ducts of internal combustion engines includes an elongated hollow metal body having a shape which, relative to a symmetry axis, substantially corresponds to a solid of revolution defining at its inside a cavity having opposite bases, at least one of which has an axial opening, and a closed lateral wall connecting the opposite bases and having at least one radial opening over which a concave blade is arranged extending radially outward from a portion of the peripheral edge of the radial (Continued)

opening and surrounding a portion of the radial opening so as to define, in a first angular direction relative to the symmetry axis, a corresponding concave screen or spoon and, in a second, opposite direction, a mouth intended for the passage of gases and located substantially in front of the concave screen or spoon.

14 Claims, 12 Drawing Sheets

(58) Field of Classification Search
CPC .............. B01F 25/313; B01F 25/3131; B01F 25/4315; B01D 53/9418; B01D 53/9431; B01D 53/9436; B01D 53/944; B01D 53/9495
USPC ................................. 366/165.2; 60/324, 326
See application file for complete search history.

(56) References Cited

U.S. PATENT DOCUMENTS

| | | |
|---|---|---|
| 2007/0204751 A1 | 9/2007 | Wirth et al. |
| 2009/0266064 A1 | 10/2009 | Zheng et al. |
| 2009/0320453 A1 | 12/2009 | Salanta et al. |
| 2012/0320708 A1 | 12/2012 | Geibel |
| 2014/0033686 A1* | 2/2014 | Fischer .............. B01F 25/4315 60/286 |
| 2015/0218996 A1 | 8/2015 | Brandi et al. |
| 2018/0178171 A1* | 6/2018 | Tyni .................... B01F 23/2132 |
| 2019/0101037 A1* | 4/2019 | Golin ..................... F01N 3/021 |

FOREIGN PATENT DOCUMENTS

| | | |
|---|---|---|
| EP | 2607641 A1 | 6/2013 |
| FR | 1152871 | 2/1958 |
| WO | 2015/076765 A1 | 5/2015 |
| WO | 2015/164356 A1 | 10/2015 |

* cited by examiner

STATIC MIXER FOR EXHAUST GAS DUCTS OF INTERNAL COMBUSTION ENGINES, METHOD OF MANUFACTURING THEREOF AND EXHAUST UNIT INCORPORATING THE MIXER

TECHNICAL FIELD

The invention relates to a static mixer for exhaust gas ducts of internal combustion engines, to an exhaust unit incorporating the mixer and to a method of manufacturing the mixer.

The mixer according to the invention can find application in exhaust gas ducts of internal combustion engines in which it is necessary to promote mixing of exhaust gases with a substance, or a mixture of substances, capable of chemically interacting with the exhaust gases. A particular example of application of the mixer according to the invention relates to exhaust units in which a selective catalytic reduction (SCR) of nitrogen oxides takes place.

Prior Art

Static mixers are commonly used in order to promote mixing of the exhaust gases with the reducing agent, introduced in gaseous or liquid state into the exhaust systems of internal combustion engines.

In this context, the static mixer is mainly aimed at promoting the formation of a highly homogeneous mixture and causing the reducing agent introduced into the exhaust system to be evaporated as much as possible.

In order to meet this requirement, static mixers are at present produced, which comprise a set of blades with various orientations inside the duct in which the exhaust gases and the reducing agent mixture flow.

The blades are generally associated with an annular frame intended to adhere to the internal walls of the duct housing the mixer, which is generally transversely arranged in the duct so that the exhaust gas flow is intercepted by said blades.

The static mixer promotes mixing of the gases with the reducing agent, generally thanks to the increase of the turbulence phenomenon within the exhaust gas flow.

Yet, the provision of a static mixer in the region where gases flow causes a pressure increase inside the exhaust system. Such a pressure increase is a drawback, since it is of hindrance to the discharge of the exhaust gases and, generally, it may be more or less significant, depending on the configuration of the mixer and of the exhaust system.

Moreover, the surface of a mixer can cause condensation of the reducing mixture, with consequent formation of a liquid film, which adheres to the blades, thereby causing a reduction in the effectiveness of the mixer itself.

Thus, two phenomena are to be countered when designing a mixer of the abovementioned kind.

The first phenomenon is the one determined by excessive pressure increases in the exhaust system housing the mixer. The second phenomenon is the one determined by the reduction of the mixing capability, resulting from the formation of condensate of the reducing agent on the mixer surfaces.

In an attempt to achieve the best compromise between the opposite requirements of attaining a good mixing and preventing the occurrence of the above drawbacks, different solutions have been proposed hitherto.

Some solutions use a matrix of vanes the density, inclination and size of which are chosen by taking into account the above requirements. US 2007/0204751 discloses an example of such kind of mixer.

Other solutions provide a set of blades, which generally are radially arranged within the duct in which the gases flow and are oriented so as to cause mixing of said gases with the reducing agent mixture. Static mixers of this second type are disclosed, for example, in U.S. Pat. No. 7,533,520, US 2009/0320453, US 2009/0266064 and US2012/320708.

In all the aforesaid solutions, the effort to find the best compromise between the requirements of mixing and free flowing for the exhaust gases is clearly apparent.

Notwithstanding these efforts, the prior art mixers, however, do not wholly solve the problem of how to obtain the best mixing, while at the same time minimizing the above drawbacks.

Moreover, the efforts made till now result in solutions that are more and more elaborate, complex and expensive to be manufactured.

In the field, therefore, there still exists a strong need to have a static mixer which is highly efficient, does not cause significant pressure increases, is scarcely prone to promote the formation of condensate and does not have the above drawbacks related to the manufacturing complexity and costs.

Thus, it is a first object of the invention to achieve such a result, by providing a static mixer device for the treatment of exhaust gases, which enables a better mixing with respect to the prior art devices and causes a reduced pressure increase and a reduced capability to form condensate.

A further object of the invention is to provide a static mixer of the kind discussed above, which can be industrially manufactured in simpler manner and at lower costs than prior art mixers.

A not least object of the invention is to provide a mixer of the aforementioned type, which can be used substantially in any exhaust systems exploiting the selective catalytic reduction SCR technology.

These and other objects are achieved by the static mixer for the treatment of exhaust gases and by the manufacturing method thereof as claimed in the appended claims, which form an integral part of the technical teaching provided herein in connection with the invention.

DISCLOSURE OF THE INVENTION

The mixer according to the invention essentially comprises an elongated hollow metal body, in which a pair of opposite, preferably parallel bases are defined. The body of the mixer can be of substantially any elongated shape and, preferably, it is a cylindrical of frustoconical body. At least one of the opposite bases, preferably the largest one when said bases have surfaces with different areas, is provided with at least one axial opening. The body of the mixer further comprises a lateral wall defining a corresponding lateral surface extending between said opposite bases. Advantageously, according to the invention, the lateral wall is closed and is provided with at least one lateral opening or window.

Preferably, the static mixer for exhaust gas ducts of internal combustion engines according to the invention comprises an elongated hollow metal body having a shape, which, relative to a symmetry axis, substantially corresponds to a solid of revolution. Inside the body of the mixer, there is defined a cavity surrounded by a lateral wall connected to opposite bases, at least one of which is provided with a preferably axial opening. According to the invention, the lateral wall is closed and provided with at least one radial opening over which a concave blade is arranged. The concave blade extends radially outward of the lateral wall of the mixer body from a portion of the peripheral edge of the radial opening. The concave blade further surrounds a portion of the radial opening so as to define, in a first angular direction relative to the symmetry axis of the mixer body, a corresponding concave screen or spoon or lobe and, in a second, opposite direction, a mouth intended for the passage of gases and located substantially in front of the concave screen or spoon.

According to the invention, the mixer body can be made of a single part, i.e. as a single piece, or can consist of several sub-parts mutually assembled to form a single element.

In addition, according to the invention, the mixer is preferably configured and housed in an exhaust unit so that the whole gas flow in transit passes through said at least one lateral opening and said flow enters or exits through a single axial opening. For this reason, according to the invention, at least one of the opposite bases of the mixer body, preferably the minor base when the mixer body has a frustoconical shape, is closed so as to prevent transit of gases, i.e. it is exhaust gas-tight. Said exhaust gas-tight base can be closed by the material of said mixer body or by a separate element such as, for example, a reducing agent sprayer.

As will become more evident from the ensuing description of some preferred embodiments of the invention, the mixer according to the invention does not require any additional structures for generating the vortex-like flow in the exhaust gases passing through a treatment unit.

The mouths and openings and corresponding blades make it possible to define substantially a baffle integrated in the mixer body, with a single front for the passage of gases, thanks to which inlet leakages are limited and flows are best directed in order to obtain an optimal vortex-like flow.

With this feature, the mixer finds advantageous application in a plurality of arrangements with the possibility for the exhaust gas flow to flow into the device through the mouths defined by the blades and to exit in the form of a vortex-like flow from the open end, or to flow into the device in the opposite direction, entering from the open end and exiting as a vortex-like flow through the mouths.

The performances of the mixer according to the invention are advantageously independent of, or substantially indifferent to, the angle of incidence of the exhaust gas flow onto the device. As a result, the reducing agent or mixture, for example AdBlue®, can be injected into the gas flow according to a plurality of configurations, i.e. inside or outside the mixer, upstream or downstream of the mixer, in a direction coaxial or incident to the gas flow, along the direction of the exhaust gas flow, in parallel flow, or in counter-flow.

Advantageously, therefore, the mixer according to the invention is a substantially universal device, which does not require any substantial modifications, in exhaust gas treatment units configured even in very different manners.

The static mixer according to the invention can advantageously be applied in exhaust gas ducts of internal combustion engines, for example Diesel cycle engines.

BRIEF DESCRIPTION OF THE DRAWINGS

Some preferred embodiments of the invention will be described below with reference to the annexed drawings, in which:

FIG. 6 is a schematic view of the geometry of the mixer on the sectional plane in

FIG. 5;

The same reference numerals have been used in all the figures to identify the same or functionally equivalent components.

DESCRIPTION OF SOME PREFERRED EMBODIMENTS

Referring to FIGS. 1 to 4, a static mixer 11 is illustrated, intended for exhaust gas ducts of internal combustion engines and made in accordance with a preferred embodiment of the invention. The mixer 11 comprises a hollow body 13 having an elongated shape. In the illustrated embodiment, the body 13 has a substantially frustoconical shape relative to a symmetry axis "S", i.e. the body 13 is made substantially as a solid of revolution relative to said axis "S". Inside the body 13, there is defined a cavity 15 delimited, at its opposite ends, by a pair of bases 17, 19 and laterally by a closed lateral wall 23 connected to the opposite bases 17,19.

According to the invention, the lateral wall 23 is provided with a plurality of radial openings 25, over each of which a corresponding concave blade 27 is arranged. The concave blade 27 extends radially outward of the lateral wall 23 of the body of the mixer 11 from a portion of the peripheral edge 29 of the radial opening 25. In addition, each concave blade 27 surrounds a portion of the radial opening 25 and defines, in a first angular direction, clockwise relative to the symmetry axis in FIG. 4, a corresponding concave screen or spoon 31 and, in a second angular direction, counter-clockwise in FIG. 4, a mouth 33 intended for the passage of gases and located substantially in front of the concave screen or spoon 31. In the illustrated embodiment, there is a total of six radial openings 25, which are identical and equally spaced relative to one another, i.e. arranged angularly spaced at 60° from one another. In addition, still referring to the illustrated embodiment, the opening 25 and the mouth 33 have an approximately quadrilateral shape, with the major sides arranged in an approximately axial direction, i.e. approximately parallel to the axis of revolution of the body 13.

According to the illustrated embodiment of the invention, the body 13 of the mixer 11 comprises a minor base 17, which can be closed or open depending on the applications, and a major base 19, preferably always open. In the shown embodiment, the minor base 17 is provided with an opening 17a for allowing entrance of the jet coming from a sprayer or nozzle spraying a mixture of a substance, usually containing urea, capable of promoting the desired chemical reaction in the exhaust gases. Preferably, said sprayer entirely occupies the opening 17a and the corresponding nozzle is oriented inward of the cavity 15, whereby said minor base is impermeable to the gases passing through the mixer 11.

Figure 1:
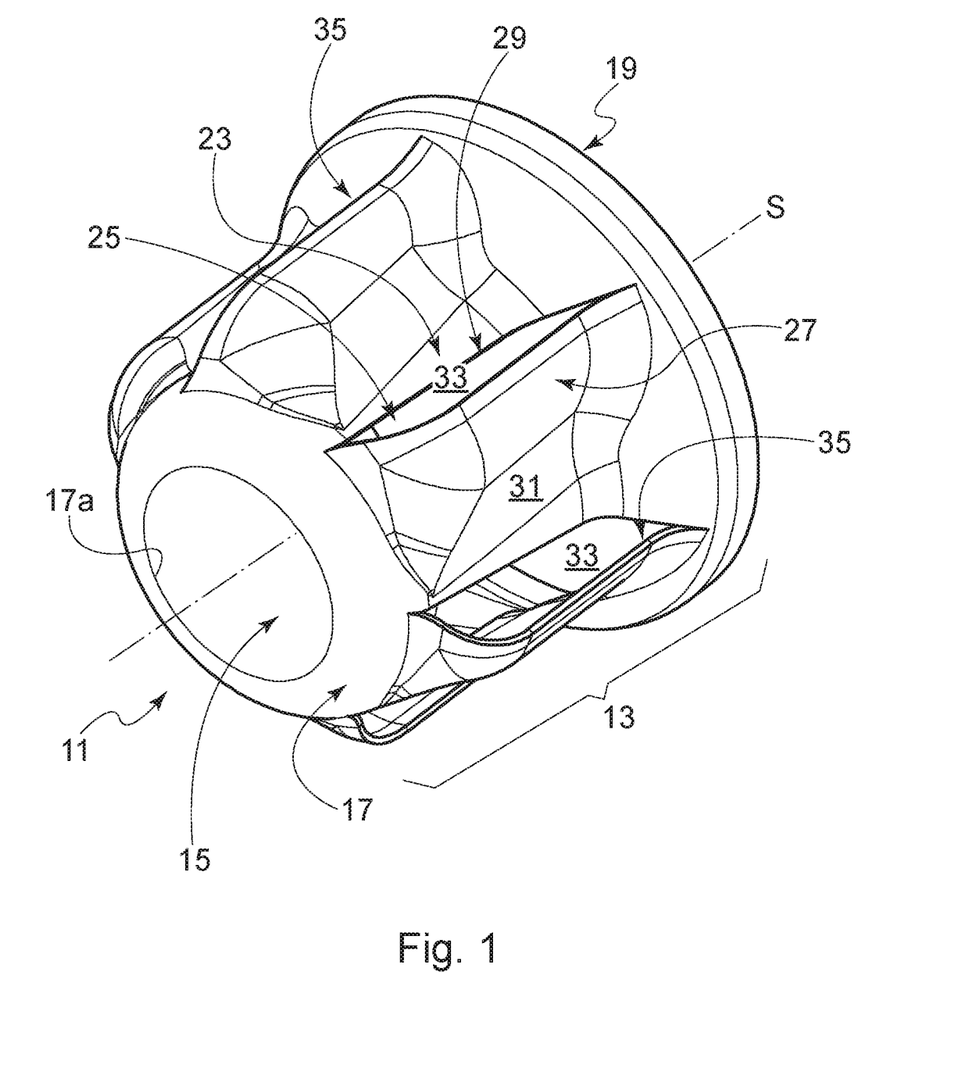
FIG. 1 is a perspective front view of the mixer according to a preferred embodiment of the invention.
Figure 2:
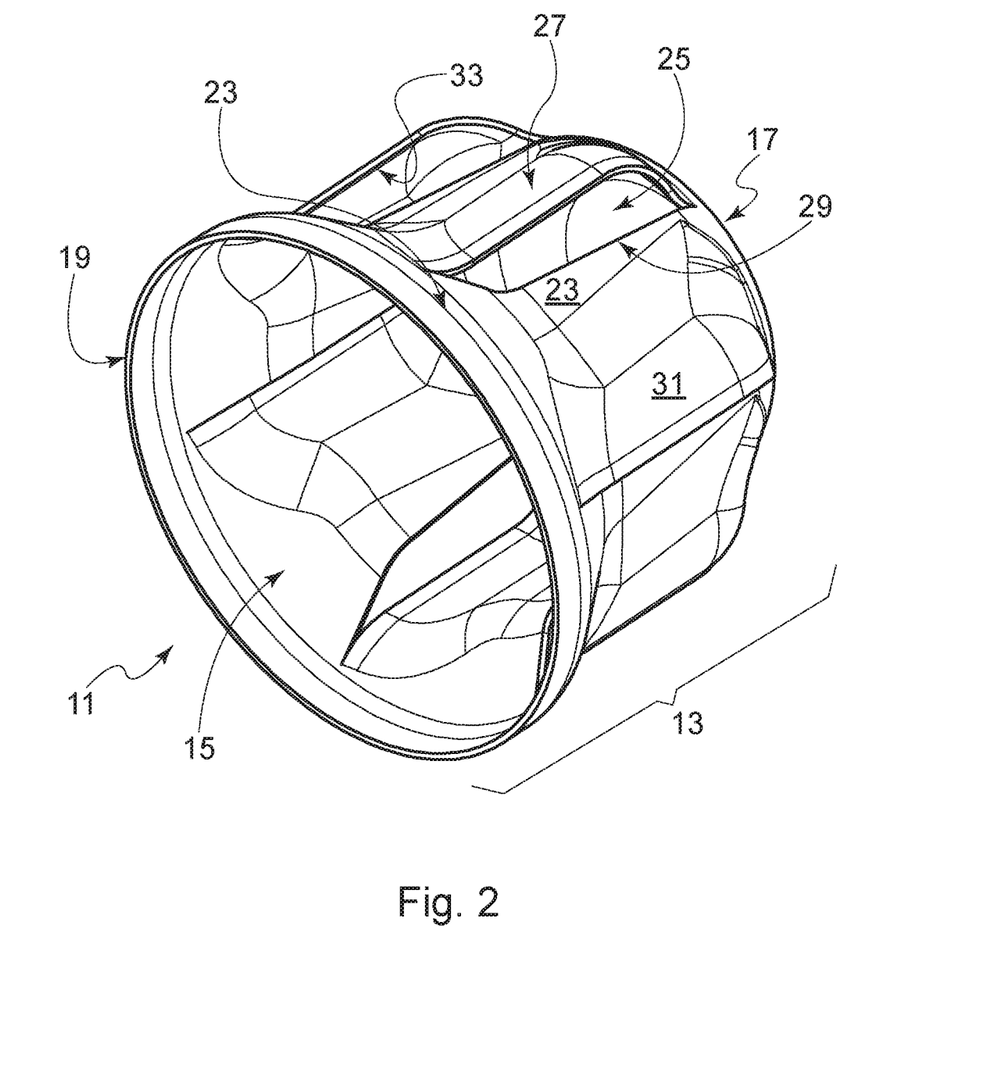
FIG. 2 is a perspective rear view of the mixer in FIG. 1.

As can be better appreciated from FIG. 1, the mouth 33 is delimited by a peripheral edge 35 subtending a minimum surface area, substantially incident on the lateral wall 23 of the body 13 of the mixer 11. The edge 35 of the mouth 33 further has, preferably, on the lateral wall 23, a portion in common with the edge 29 of the radial opening 25.

Figure 3:
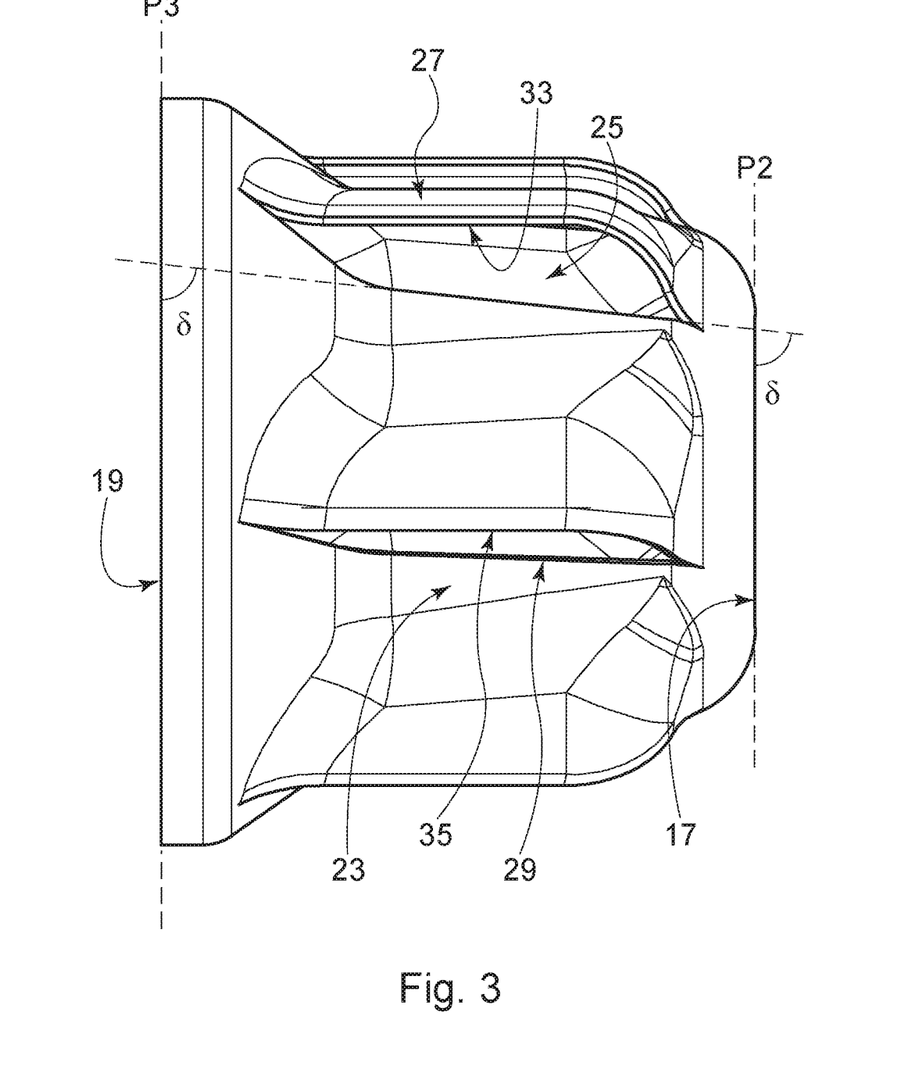
FIG. 3 is a lateral plan view of the mixer in FIG. 1.
Figure 4:
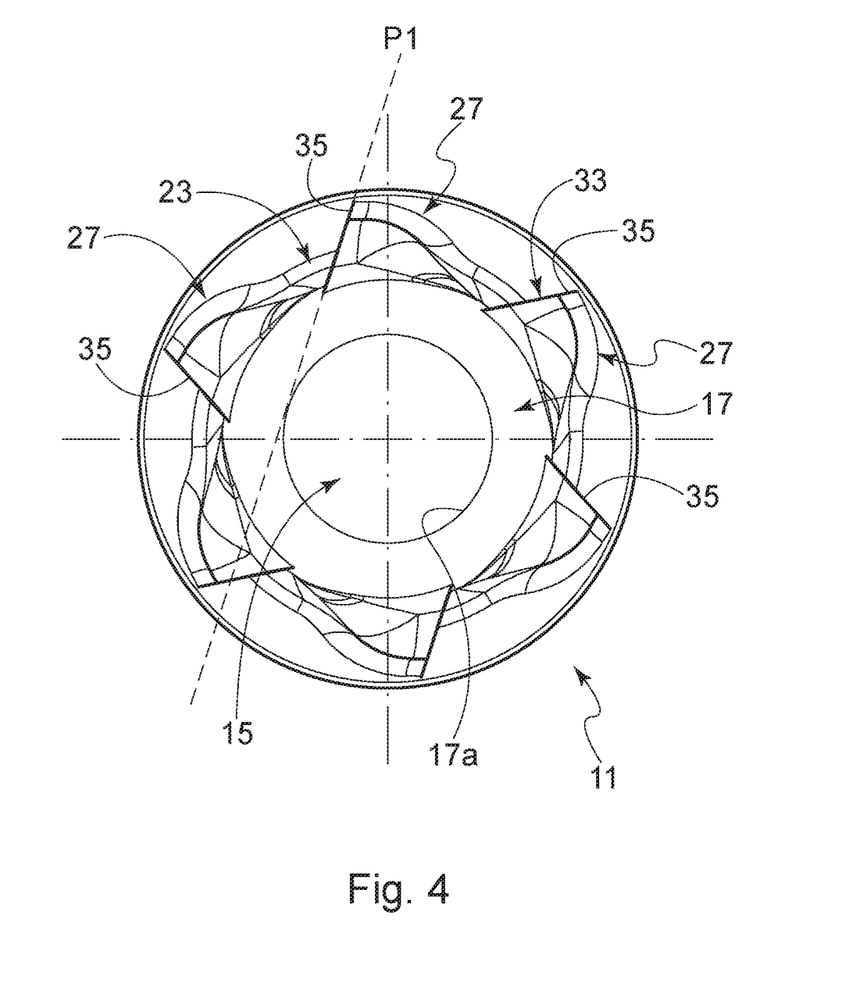
FIG. 4 is a rear plan view of the mixer in FIG. 1.

Referring in particular to FIGS. 3 and 4, in the illustrated embodiment, said peripheral edge 35 lies substantially on a plane P1, incident relative to the lateral wall 23 of the body 13 of the mixer 11. In addition, still referring to the illustrated embodiment, said plane P1 is inclined by an angle δ of about 90° relative to the planes P2 and P3 on which the opposite parallel bases, 17 and 19 lie, respectively. The minimum surface subtended by the peripheral edge 35 can further have a helicoidal development, irrespective of whether it is a flat or curved surface, and can therefore be inclined relative to the axis of revolution S and to the planes P2 and P3. In the helicoidal configuration, said angle δ will therefore be other than 90° and, depending on the embodiments, may preferably be between 45° and 135°.

The plane P1 of each mouth 33 is further preferably tangent to the same cylinder coaxial to the longitudinal axis "S" of the body of the mixer 11. In the illustrated embodiment, the radius of the cylinder to which the planes P1 are tangent is approximately equal to the radius of said opening 17a; in other embodiments, said cylinder may have radiuses different from those of the opening 17a and, furthermore, said opening 17a may be absent. According to this embodiment of the invention, the mouth 33 is oriented so as to allow passage of the gases from and towards the inner cavity 15 of the mixer 11, mainly in a direction tangential to the lateral wall 23 of the mixer body, i.e. according to a direction perpendicular to the plane of FIG. 3 and parallel to the plane of FIG. 4. Therefore, according to this arrangement of the mouths 33, when the mixer 11 is housed in an exhaust system of an internal combustion engine, the gases discharged from the engine, can, depending on the arrangement of the mixer 11 in the exhaust system, either enter the cavity 15 of the mixer 11 tangentially, passing at first through the mouth 33 and then through the opening 25, or exit said cavity 15 by passing at first through the opening 25 and then through the mouth 33, eventually reaching the environment outside the mixer 11. In both cases, the path followed by the exhaust gases between the mouth 33 and the opening 25, or vice versa, will be a substantially vortex-like path, as the mouth 33 and the opening 25 are oriented on planes or surfaces inclined relative to each other.

According to the embodiment shown in FIGS. 1 to 4, the mouth 33 is oriented so as to minimize the passage of the gases from and towards the inner cavity 15 of the mixer 11 in an axial direction, i.e. in a direction parallel to the symmetry axis "S".

Figure 5:
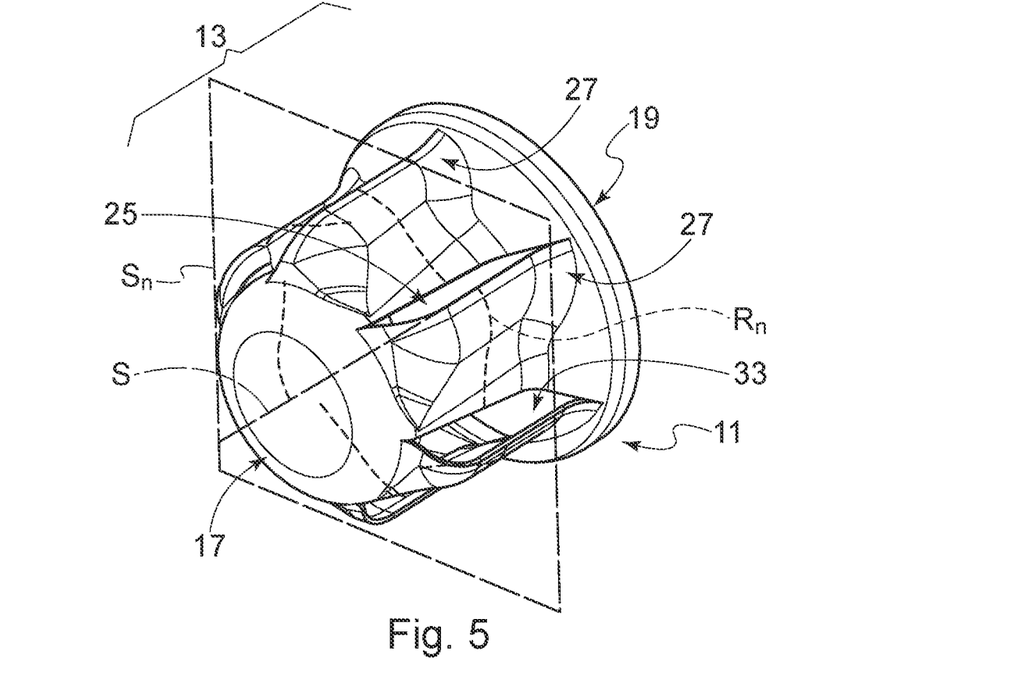
FIG. 5 is a view corresponding to FIG. 1 in which a section plane is indicated.
Figure 6:
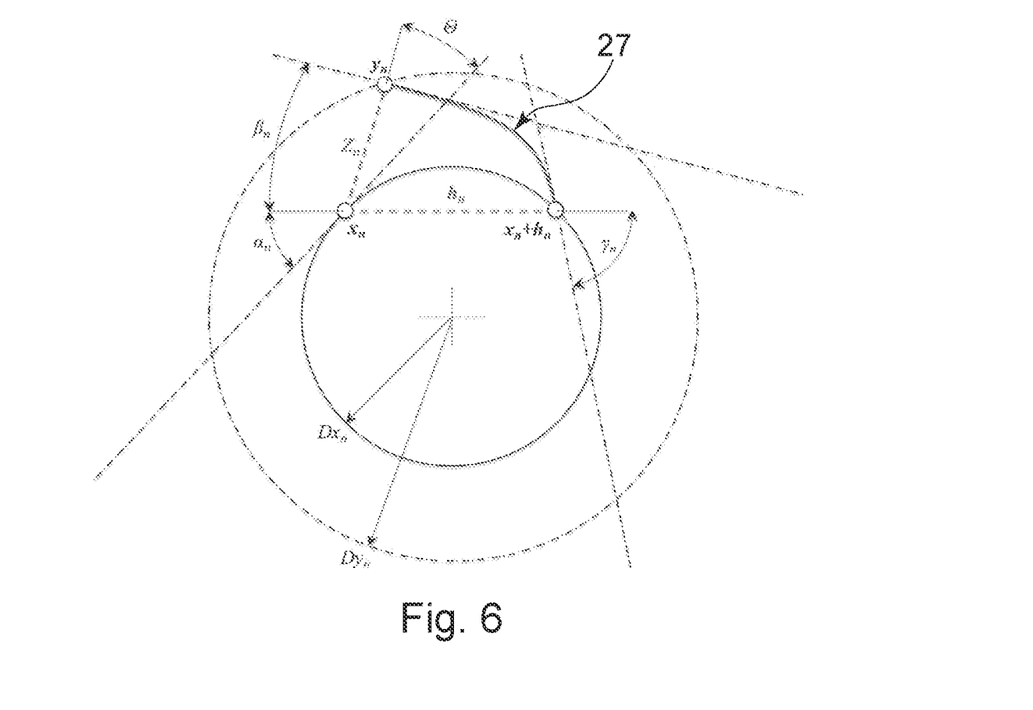

Referring to FIGS. 5 and 6, the geometry of the mixer according to a preferred embodiment of the invention will be described in detail.

FIG. 5 shows a general sectional plane $S_n$, perpendicular to the axis of revolution "S", transversely cutting through the body 13 of the mixer 11 along the dashed line $R_n$. In FIG. 6, the plane $S_n$ intersects the edge 29 of the radial opening 25 at the points $x_n$ and $x_n+h_n$ and the edge 35 of the mouth 33 at the points $x_n$ and $y_n$. The segment $h_n$ represents the transverse width on the plane $S_n$ of the radial opening 25, defined by the angle $\alpha_n$ between the straight line $h_n$ and the straight line tangent to the circumference at $x_n$. In this embodiment of the invention, the radial opening 25 and the mouth 33 share the portion of their respective edges 29 and 35 on the lateral wall 23, whereby the point $x_n$ in which said edges 29 and 35 intersect the plane $S_n$ coincides. The radial opening 25 is extended over by the blade 27, the profile of which is defined by the angles $\beta_n$ and $\gamma_n$ formed between the straight line $h_n$ and the tangent to the blade 27, respectively, at the points $y_n$ and $x_n+h_n$. On the plane $S_n$, the blade 27 is contained between the circumferences with radius $Dx_n$ and $Dy_n>Dx_n$, both centered on the symmetry axis S of the solid of revolution which defines the body 13 of the mixer 11. By joining the points $x_n$ and $y_n$ to a straight line $Z_n$, having an angle $\theta_n$ between 0°÷90° relative to the tangent to the circumference with radius $Dx_n$ at the point $x_n$, it is possible to obtain the plane on which the surface subtended by the edge 35 of the mouth 33 extends, in the case where said mouth extends over a plane, as in the example of the FIGS. 1 to 4, or the straight lines approximating said surface at each section $S_n$ in the case of the non-plan minimum surface area, subtended by the edge 35.

Figures 7A, 7B, 7C:
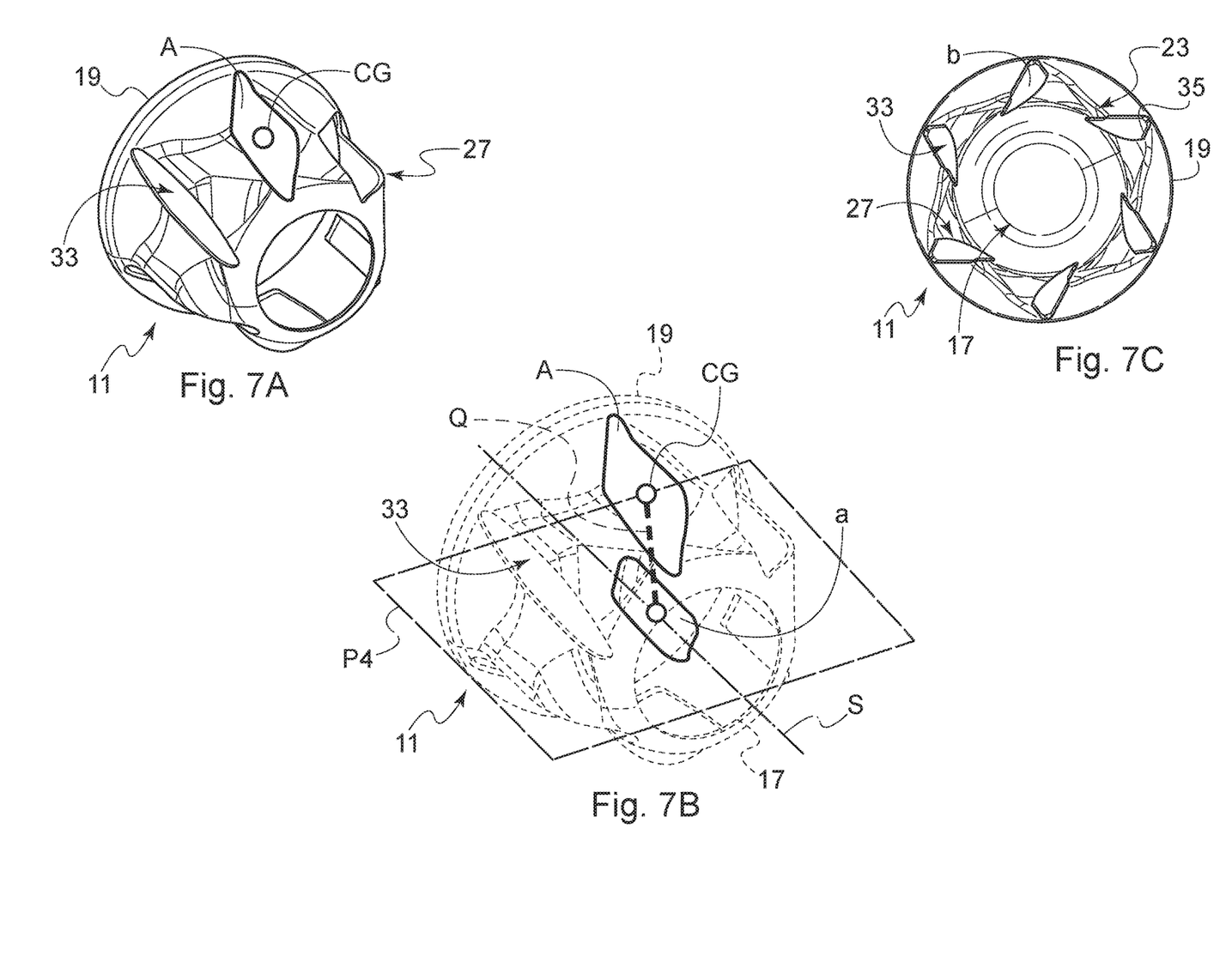
FIGS. 7A and 7B are perspective views of a variant of the mixer, in which the geometric surfaces are shown.
FIG. 7C is a plan view of the mixer in FIGS. 7A and 7B.

Referring to FIGS. 7A to 7C, with "A" indicating the minimum surface area subtended by the edge 35 of the mouth 33, be it plan or curved, and with "a" indicating the area of the projection of said surface on a plane P4 perpendicular to the straight line Q passing through the geometric center CG of said surface and the axis of revolution "S", according to the invention the following will preferably be obtained:

$$0 \leq \frac{a}{A} < 1$$

By geometric center CG of the minimum surface area subtended by the edge 35, it is meant the "median position" of the points of the profile generated by said surface, relative to any tridimensional reference system, i.e. the arithmetic mean of the positions of each of said points along the directions x, y, z of any spatial reference system.

FIGS. 7A-7C represent an embodiment of the invention in which the edge 35 of the mouth 33 lies on a curved surface and, with "b" indicating the projection of the minimum surface area that is subtended by the edge 35 on a plane perpendicular to the axis of revolution "S" and does not intercept the said surface, according to the invention the following will preferably be obtained:

$$0 \leq \frac{b}{A} < 0,3$$

In other words, assuming that the major base 19 of the body 13 of the mixer 11 lies on a plane perpendicular to the axis of revolution "S", the projection of the minimum area surfaces subtended by the edge 35 of the mouths 33 on said plane will have an area b smaller by 30% than the area A of said minimum surface area.

Advantageously, according to the invention, the mixer 11 can be used, without substantial modifications or adaptations, in a plurality of applicative conditions. The mixer 11 can be oriented within an exhaust gas treatment unit with its axis of revolution "S" along any direction relative to the predominant direction of the gases. For example, the mixer 11 can be oriented with the axis of revolution "S" perpendicular or parallel to the advancing direction of the exhaust gases. In addition, whatever the configuration adopted for the body of the mixer 11 within the exhaust gas treatment unit may be, the mixer 11 can be associated to a sprayer of a substance suitable for causing the desired chemical reaction, for example a reducing agent such as urea, oriented substantially according to any direction relative to the axis of revolution "S". In particular, the spraying nozzle can be oriented with its longitudinal axis parallel to the axis of revolution "S" of the mixer 11, either in the same direction as the flow of exhaust gases, or in counter-flow, or the spraying nozzle can be oriented with its axis along a direction inclined relative to the axis of revolution "S". In addition, still according to the invention, the mixer 11, when having different opposite bases, for example when the body 13 is made with a frustoconical shape, can be indifferently oriented with the minor base upstream of the major base 19, or vice versa, in the predominant direction of advancing of the exhaust gases.

Figure 8:
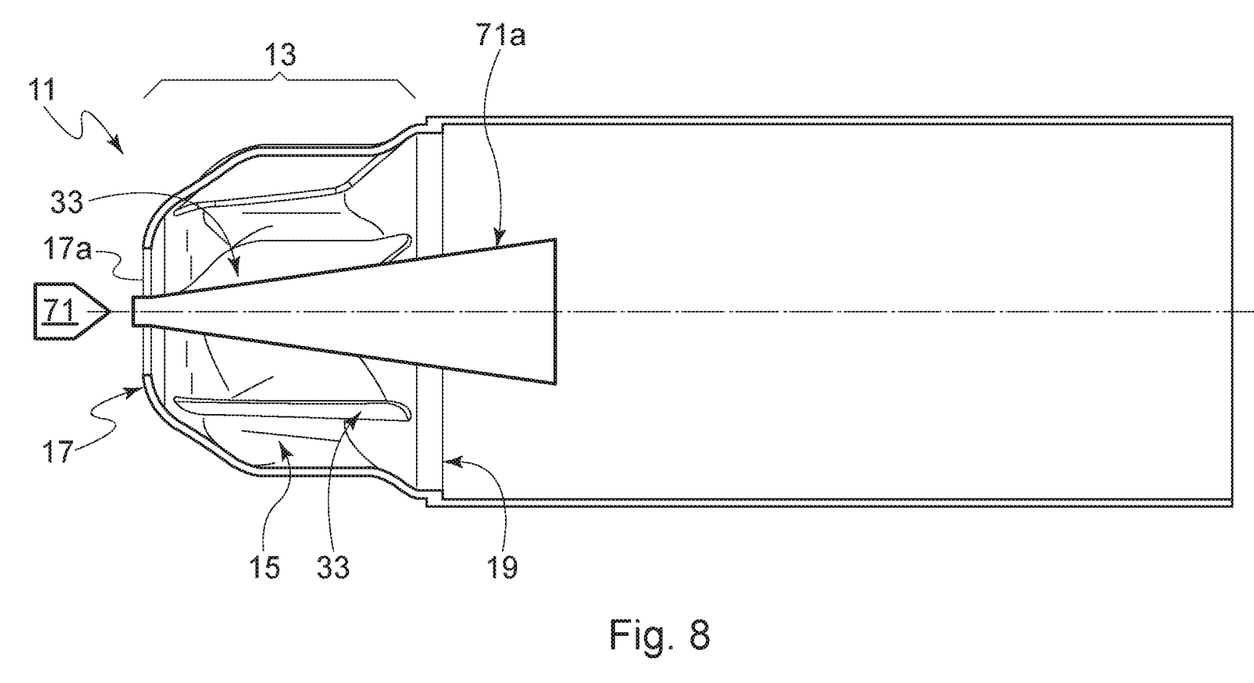
FIG. 8 is schematic sectional view along a longitudinal plane of a preferred embodiment of the mixer associated to a spray nozzle.

Referring in particular to FIG. 8, there is illustrated a configuration of the invention, in which both opposite bases 17, 19 of the body 13 of the mixer 11 are open. The numeral 71 indicates a general spraying nozzle located in front of the opening 17a or, more preferably, within said opening 17a of the base 17, which, in the illustrate embodiment, corresponds to the minor base, the body 13 having a frustoconical shape, so as to completely engage said opening 17a, thus preventing the exhaust gases from entering through said opening 17a and making said base 17 impermeable to the exhaust gases. Preferably, according to the invention, the nozzle 71 is arranged relative to the body 13 in such a way that the jet of substance exiting the nozzle, typically having a frustoconical shape, indicated with the reference numeral 71a in the figure, does not impinge upon the wall of the cavity 15 within the mixer 11 and is distributed in the flow of gases, immediately downstream of the second base 19, opposite to the base from which the jet 71a enters the body 13 of the mixer.

Figure 9:
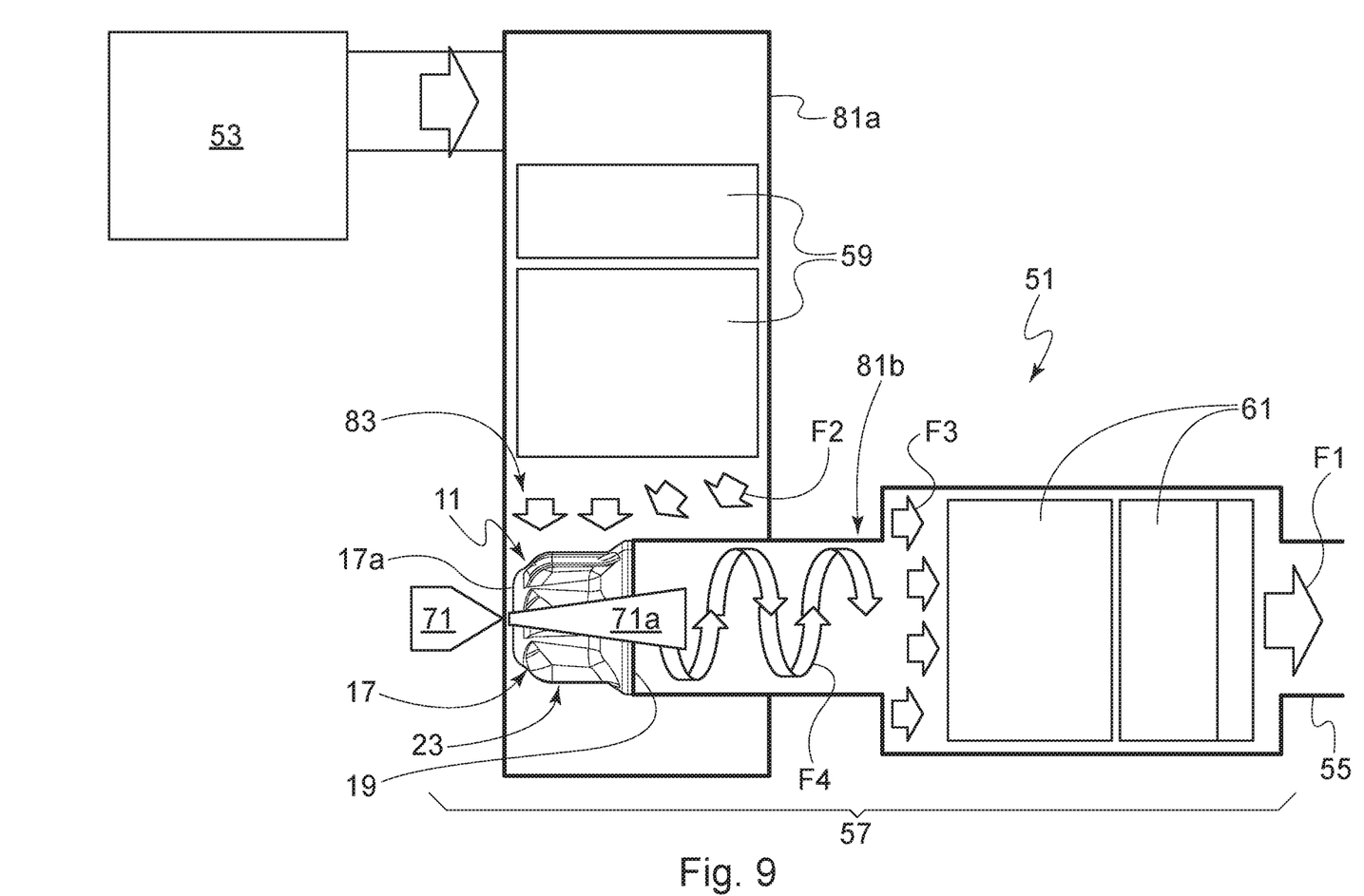
FIGS. 9 to 11 are schematic views of corresponding embodiments of the exhaust gas treatment unit according to the invention.
Figure 10A:
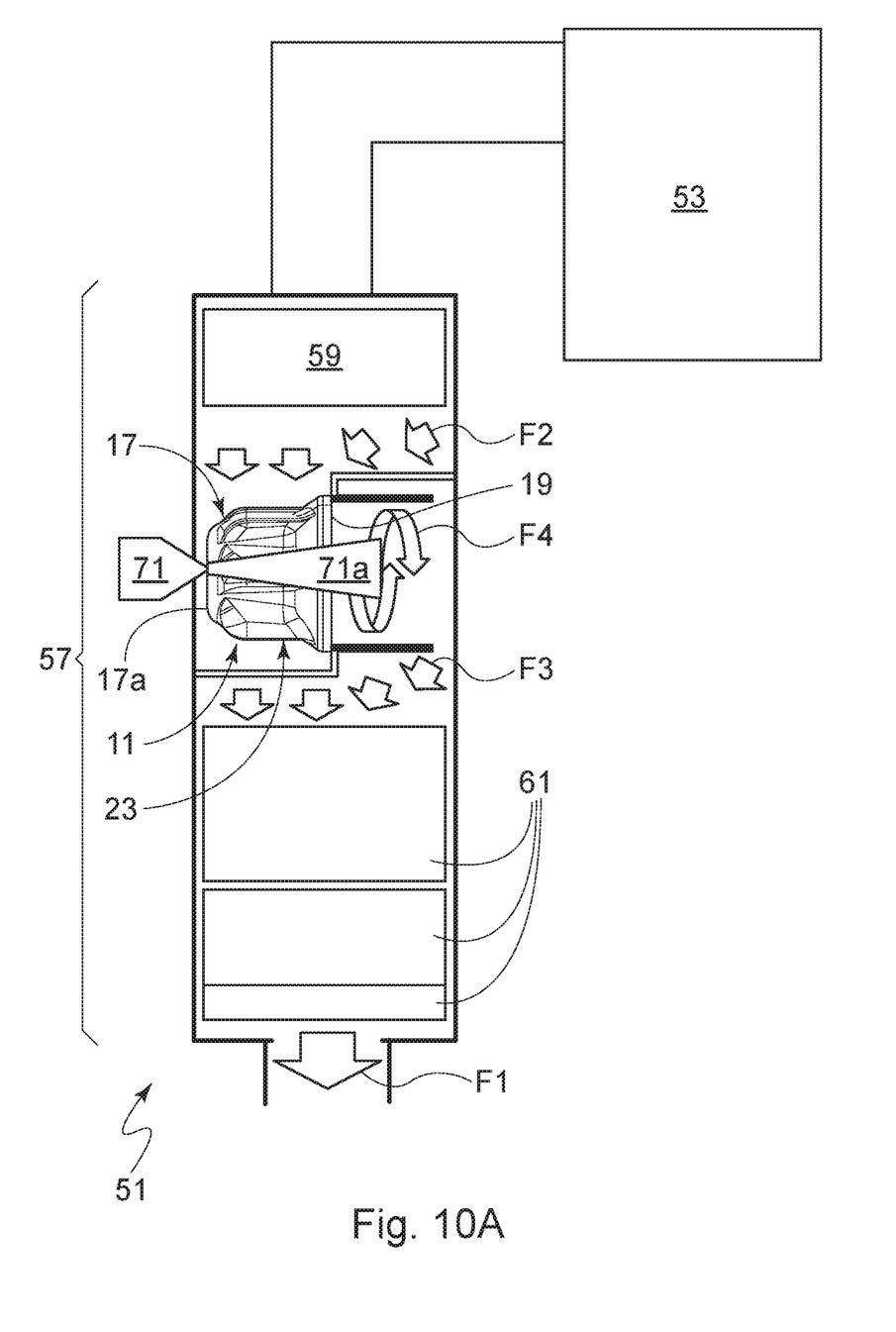
Figure 10B:
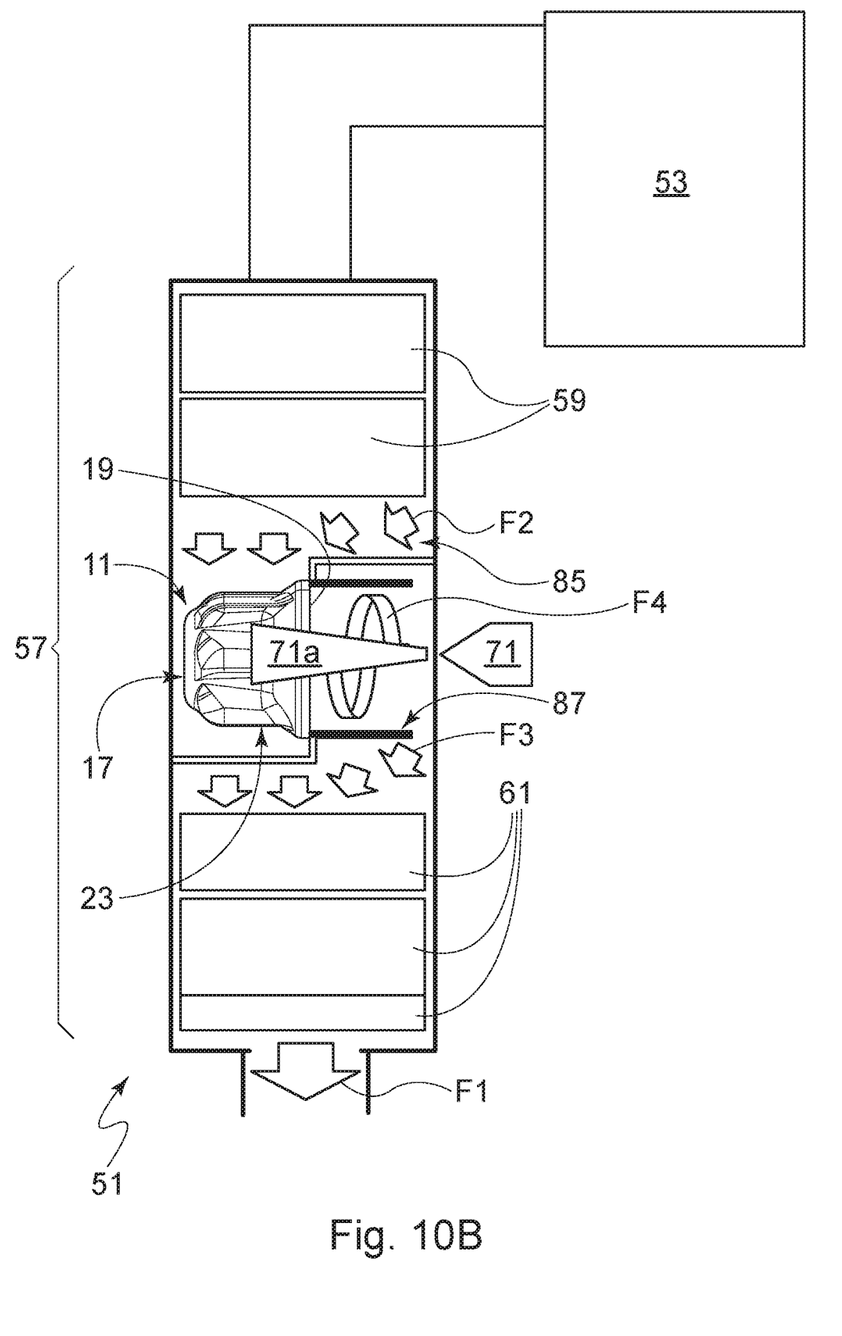
Figure 11:
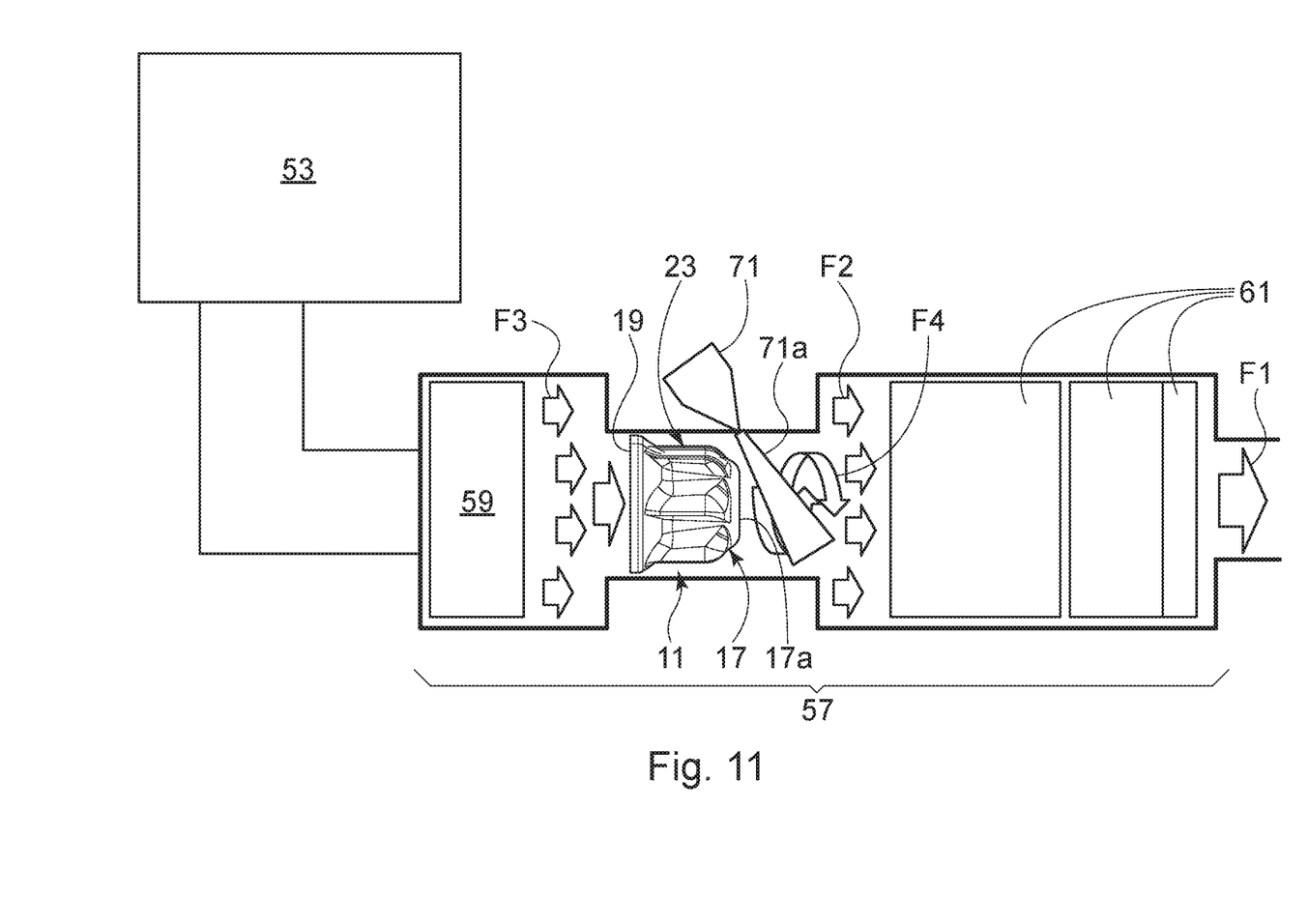

Referring to FIGS. 9 to 11, these show corresponding embodiments of an exhaust gas treatment unit 51 of an internal combustion engine 53, in which a static mixer 11 is incorporated, made according to the invention. The treatment unit 51 connects an internal combustion engine 53, which, in the illustrated example, is a Diesel cycle engine, to an outlet duct 55 communicating with the outer environment, arrow F1. The unit 51 comprises at least one intermediate duct 57 for the passage of the exhaust gases coming from the engine 53 and directed to the outlet duct 55. The intermediate duct 57 generally houses at least a first exhaust gas treatment unit 59, upstream of the mixer 11, and at least a second exhaust gas treatment unit 61, downstream of the mixer 11.

For example, the first unit 59 arranged upstream of the mixer 11 may comprise an "Oxidation Catalyst" (DOC), possibly associated with a "Diesel Particulate Filter" (DPF), and the second unit 61 arranged downstream of the mixer 11 may comprise a "Selective Catalytic Reduction" (SCR) unit, or an SCR unit incorporated in a "soot filter" (SCRoF), possibly associated with an "Ammonia Slip Catalyst" (ASC) or a "Clean-Up Catalyst" (CUC), or a "Diesel Particulate Filter" (DPF), possibly associated with an "Ammonia Slip Catalyst" (ASC) or a "Clean-Up Catalyst" (CUC) device.

In the illustrated embodiments, a static mixer 11 made according to the present invention and having a substantially bell-like or frustoconical shape is provided between the first unit 59 and the second unit 61. More precisely, and relative to the preferential direction of flowing of the exhaust gases through the intermediate duct 57 (arrows F2, F3), the first unit 59 is arranged downstream of the internal combustion engine 53 and upstream of the mixer 11, and the mixer 11 is arranged upstream of the second unit 61. According to the described arrangement, therefore, the exhaust gases exiting the internal combustion engine 53 flow, in order, though the first unit 59, the mixer 11 and second unit 61, before passing through the outlet duct 55 and being introduced into the atmosphere, arrow F1.

Referring now in particular to FIG. 9, there is illustrated a first embodiment of the exhaust gas treatment unit 51. According to this embodiment, the mixer 11 comprises a minor base 17 having the aperture 17a for entrance of a flow of substance, for example urea, exiting a spraying nozzle 71, preferably associated with a sprayer entirely occupying the opening 17a so as to prevent passage of the exhaust gases through said opening 17a. According to the invention, the opening 17a, if any, is configured for preventing passage of the exhaust gases therethrough. The opposite base 19 of the mixer 11 is open and allows exit of the exhaust gases coming from the I.C. engine 53 and radially directed against the lateral wall 23 of the mixer 11. In the shown embodiment, the intermediate duct 57 defines a substantially "L"-shaped path and includes a first portion 81a defining a chamber 83 housing the first unit 59 and the mixer 11, and a second portion 81b partially penetrating in the chamber 83 and surrounding the second base 19 of the mixer so that the entire flow of exhaust gases exiting the opening of the base 19 is directed inside said second duct portion 81b, where the exhaust gases assume a whirlpool vortex-like path, arrows F4. Preferably, both portions 81a, 81b have a cylindrical cross-section and are straight, and the portion 81b is oriented with its axis substantially perpendicular to the axis of the section 81a. In addition, the mixer 11 housed within the chamber 83 is arranged substantially coaxial to the second duct portion 81b and receives the exhaust gas, axially flowing through the first duct portion 81, through the mouths 33 and the corresponding radial openings 25, arrows F2.

According to this embodiment, the sprayer 71 is preferably configured so that the mixture sprayed by the nozzle 71 does not impinge against the inner surface of the lateral wall 23 of the mixer 11 and becomes mixed with the exhaust gas mainly outside the body of the mixer 11, inside the second duct portion 81b. Still according to this first embodiment described, the jet of substance sprayed by the spraying nozzle 71 is directed in parallel flow relative to the flowing direction of the exhaust gases downstream of the mixer 11, arrows F3,F4.

Referring to FIGS. 10A and 10B, there is illustrated a second embodiment of the exhaust gas treatment unit 51, in two embodiment variants. According to this embodiment, the mixer 11 comprises, in a first variant in FIG. 10A, an open minor base 17, and, in a second variant in FIG. 10B, a closed minor base 17. The opposite base 19 of the mixer 11 is always open and allows exit of the exhaust gases coming from the I.C. engine 53 and radially directed against the lateral wall 23 of the mixer 11. In the illustrated embodiment, the intermediate duct 57 has a substantially straight shape and defines therein a chamber 85 housing, mainly, the first unit 59, the mixer 11 and the second unit 61. Said intermediate duct 57 further comprises a screen 87 defining a passage for the gases exiting the mixer 11.

According to the first embodiment variant in FIG. 10A, the spraying nozzle 71 is arranged in front of the opening 17a of the base 17, or, more preferably, within said opening 17a, so as to entirely occupy the gap of said opening 17a, thus preventing passage of the exhaust gases and making said base 17 impermeable to the exhaust gases, and the jet emitted by the sprayer 71 is directed into the cavity 15. In this first embodiment variant, the spraying nozzle 71 is oriented so as to spray a mixture of substance in parallel flow relative to the predominant direction of advancing of the exhaust gases through the intermediate duct 57, arrows F4.

According to the second embodiment variant in FIG. 10B, the spraying nozzle 71 is arranged in front of the open major base 19 of the mixer 11. In this second embodiment variant, the spraying nozzle 71 is oriented so as to spray a mixture of substance in counter-flow relative to the predominant direction of advancing of the exhaust gases through the intermediate duct 57, arrows F4.

The screen 87 provided downstream of the mixer 11 partially surrounds the mixer 11 and is arranged to convey the exhaust gases that have passed through the mixer 11 towards the second exhaust gas treatment unit 61 housed within the intermediate duct 57.

In addition, similarly to the first embodiment, the exhaust gases coming from the engine 53 radially impinge against the lateral wall 23 of the mixer 11 and penetrate into the cavity 15 provided within the mixer 11 through the mouths 33 and the corresponding radial 25, arrows F2.

Preferably, the intermediate duct 57 has a cylindrical cross-section and the mixer 11 is housed within the duct 57 with its axis of revolution substantially perpendicular to the longitudinal axis of the duct 57 and coaxial to the screen 87.

According to this embodiment, the sprayer 71 is preferably configured so that the mixture of substance sprayed by the nozzle 71 does not impinge against the surface of the lateral wall 23 of the mixer 11 and becomes mixed with the exhaust gas mainly outside the body of the mixer 11.

Referring now to FIG. 11, there is illustrated a third embodiment of the exhaust gas treatment unit 51. According to this embodiment, the mixer 11 comprises a preferably closed minor base 17. The opposite base 19 of the mixer 11, instead, is always open and allow entrance of the exhaust gases coming from the I.C. engine and axially directed against the mixer 11 and eventually reaching the cavity 15 defined within the mixer 11. In the illustrated embodiment, the intermediate duct 57 has a substantially straight shape and houses therein mainly the first unit 59, the mixer 11 and the second unit 61. In addition, the spraying nozzle 71 protrudes into the duct 57, downstream of the mixer 11.

In this embodiment, the spraying nozzle 71 is oriented so as to spray a mixture of substance in parallel flow relative to the predominant direction of advancing of the exhaust gases through the intermediate duct 57, arrows F3,F4,F5. In addition, the spraying nozzle 71 is provided downstream of the mixer 11 and is arranged so as to direct the mixture of substance into the duct 57, where the exhaust gases assume a whirlpool vortex-like path, arrows F4.

Preferably, the duct 57 is straight and has a cylindrical cross-section. In addition, the mixer 11 is arranged substantially coaxial to the duct 57 and receives the exhaust gas axially flowing through the portion of the duct 57 located upstream of the mixer 11, through the open major base 19.

According to this embodiment of the invention, the mouths 33 and the corresponding radial openings 25 provided on the lateral wall 23 of the mixer 11 help in producing the whirlpool vortex-like motion of the exhaust gases, thus determining optimum mixing of the urea mixture introduced by the sprayer 71.

Referring to FIGS. 12A to 12D, the method of making a static mixer according to a preferred embodiment of the invention will be described, in which the body 13 of the mixer 11 is obtained by means of a metal sheet cold molding process.

Molding preferably takes place in a sequence of successive drawing and shearing operations.

Figure 12A:
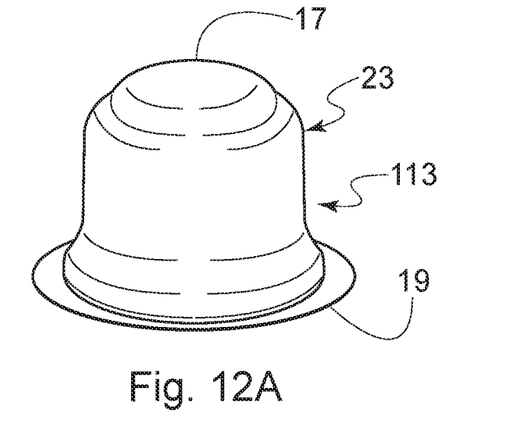
FIGS. 12A to 12C are lateral plan views of corresponding intermediate steps of manufacturing the mixer according to the invention.
Figure 12B:
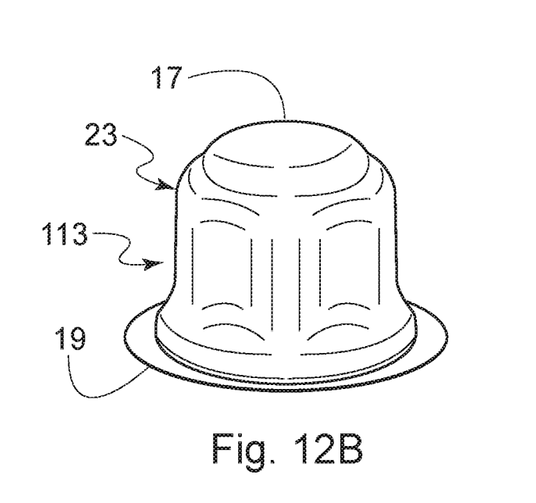

Referring to FIGS. 12A and 12B, there is illustrated an intermediate sequence of steps of the method according to this preferred embodiment of the invention, in which a bell-shaped body 113 having a lateral wall 23 and comprising a closed minor base 17 and an open major base 19 is obtained, by molding, from a metal sheet. This first working cycle is adapted to provide the lateral surface of the body 13 with the desired shape, having a cross-section that, depending on the embodiments, may be, for example, substantially circular, hexagonal, octagonal, pentagonal. At the end of this first working cycle, the body 113 has a closed lateral wall 23, which is substantially smooth and regular.

Figure 12C:
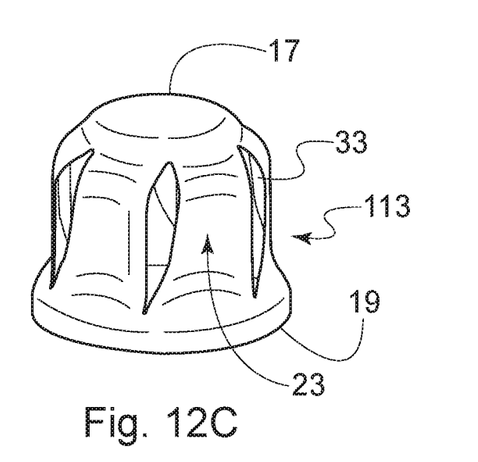

FIG. 12C shows a further intermediate step of the method according to the invention, following the cycle described above, in which the body 113 is subjected to a cutting operation, preferably a laser-cutting operation, to obtain the mouths 33.

At the end of the cycle described above, the body 113 is subjected to a further drawing step, in particular to prefect the shape of the body 113 of the mixer and the edges of the mouths 33.

Figure 12D:
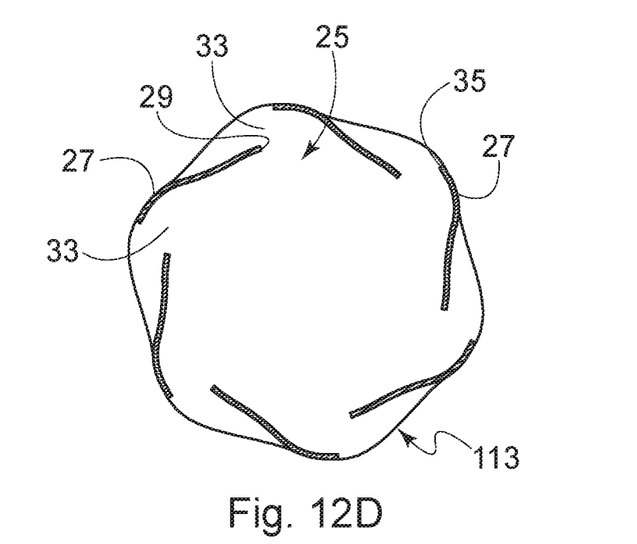
FIG. 12D is a cross-sectional view comparing the intermediate result shown in FIG. 12B with the final result.

Referring to FIG. 12D, there is illustrated a cross-section comparing the intermediate result shown in FIG. 12B with the final result. In FIG. 12D the radial openings 25, over which the blades 27 and the mouths 33 extend and which are formed by the deformation of the lateral surface of the body 113, can be seen.

Several variants and modifications falling within the same inventive principle can be made to the invention as described and illustrated.

The invention claimed is:

1. A static mixer (11) for exhaust gas ducts of internal combustion engines, comprising an elongated hollow metal body (13) having a shape which, relative to a symmetry axis (S), substantially corresponds to a solid of revolution defining at its inside a cavity (15), in which opposite bases (17,19) are defined, at least one of the opposite bases (17,19) is provided with an axial opening, and a closed lateral wall (23) is defined connected to the opposite bases (17,19) and having at least one radial opening (25) over which a concave blade (27) is arranged extending radially outward of the closed lateral wall (23) of the elongated hollow metal body (13) from a portion of a peripheral edge (29) of the at least one radial opening (25) and surrounding a portion of at least one radial opening (25) so as to define, in a first angular direction relative to the symmetry axis, a corresponding concave screen (31) and, in a second, opposite direction, a mouth (33) intended for the passage of gases and located substantially in front of the concave screen (31), wherein one of the bases of the elongated hollow metal body (13) of the static mixer (11) is closed and thus exhaust-gas tight and wherein the mouth (33) has an approximately quadrilateral shape.

2. The static mixer (11) according to claim 1, wherein the mouth (33) for the passage of gases is delimited by a peripheral edge (35) subtending a minimum surface area substantially incident on the closed lateral wall (23) of the elongated hollow metal body (13).

3. The static mixer (11) according to claim 2, wherein the mouth (33) for the passage of gases is oriented so as to allow the passage of gases from and towards the cavity (15) of the static mixer (11), mainly in a tangential direction relative to the closed, lateral wall (23) of the elongated hollow metal body (13).

4. The static mixer (11) according to claim 2, wherein a straight line ($Z_n$) passing through proximal ($x_n$) and distal ($y_n$) points of intersection relative to the symmetry axis (S), between a section plane ($S_n$) perpendicular to the symmetry axis and a proximal portion of the peripheral edge (29) of the at least one radial opening (25) and a distal portion of the peripheral edge (35) of the mouth (33), respectively, forms, with a tangent to the closed lateral wall (23) in the proximal point of intersection ($x_n$), an angle ($\theta_n$) comprised between 0 and 90°.

5. The static mixer (11) according to claim 4, wherein the mouth (33) extends radially, for the section plane ($S_n$) perpendicular to the symmetry axis, between a first circumference ($Dx_n$) on said section plane ($S_n$) passing through the proximal point of intersection ($x_n$), said first circumference ($Dx_n$) having a center in the symmetry axis, and a second circumference ($Dy_n$) on said section plane ($S_n$), passing through the distal point of intersection ($y_n$) said second circumference ($Dy_n$) having a center in the symmetry axis.

6. The static mixer (11) according to claim 5, wherein a ratio between an area "a" of a projection of a minimum surface area subtended by the peripheral edge (35) of the mouth (33) on a plane perpendicular to a straight line (Q) passing through the geometrical center of said minimum surface and the symmetry axis (S) and an area "A" of the minimum surface area meets the following equation $0 \leq a/A < 1$.

7. The static mixer (11) according to claim 5, wherein a ratio between an area "b" of a projection of a minimum surface area subtended by the peripheral edge (35) of the mouth (33) on a plane which is perpendicular to the symmetry axis (S) and does not intersect said surface, and an area "A" of said minimum surface area meets the following equation: $0 \leq b/A < 0.3$.

8. The static mixer (11) according to claim 1, wherein the mouth (33) for the passage of gases is oriented so as to minimize the passage of gases from and towards the cavity (15) of the static mixer (11) in an axial direction relative to the closed lateral wall (23) of the elongated hollow metal body (13).

9. The static mixer (11) according to claim 1, wherein between the at least one radial opening (25) and the mouth (33), and vice versa, a substantially vortex-like path for the gases is established, by virtue of the concave blade (27), in a plane perpendicular to the symmetry axis (S) of the elongated hollow metal body (13).

10. The static mixer (11) according to claim 1, wherein said solid of revolution comprises a cone or a cylinder and wherein the opposite bases (17,19) are circular and extend over respective parallel planes perpendicular to the symmetry axis (S), the lateral wall (23) of said cone or cylinder being provided with a plurality of said radial openings (25).

11. The static mixer (11) according to claim 1, wherein the elongated hollow metal body (13) of the static mixer (11) has a frustoconical shape.

12. The static mixer (11) according to claim 11, wherein one of said opposite bases (17,19) is a closed base (17) that corresponds to a minor base of the frustoconical shape of the elongated hollow metal body (13) of the static mixer (11).

13. The static mixer according to claim 1, wherein the mouth (33) for the passage of gases is delimited by a peripheral edge (35) which lies substantially on a plane (P1), incident relative to the closed lateral wall (23) of the elongated hollow metal body (13).

14. An exhaust gas treatment unit (51) of an internal combustion engine, said exhaust gas treatment unit comprising an intermediate duct (57), connecting an internal combustion engine (53) to an outlet duct (55), and the static mixer (11) according to claim 1, housed within said intermediate duct (57), wherein all the exhaust gases exiting the internal combustion engine (53) flow through the static mixer (11) before passing through the outlet duct (55) and being introduced into the atmosphere.

\* \* \* \* \*